United States Patent Office 3,105,578
Patented Oct. 1, 1963

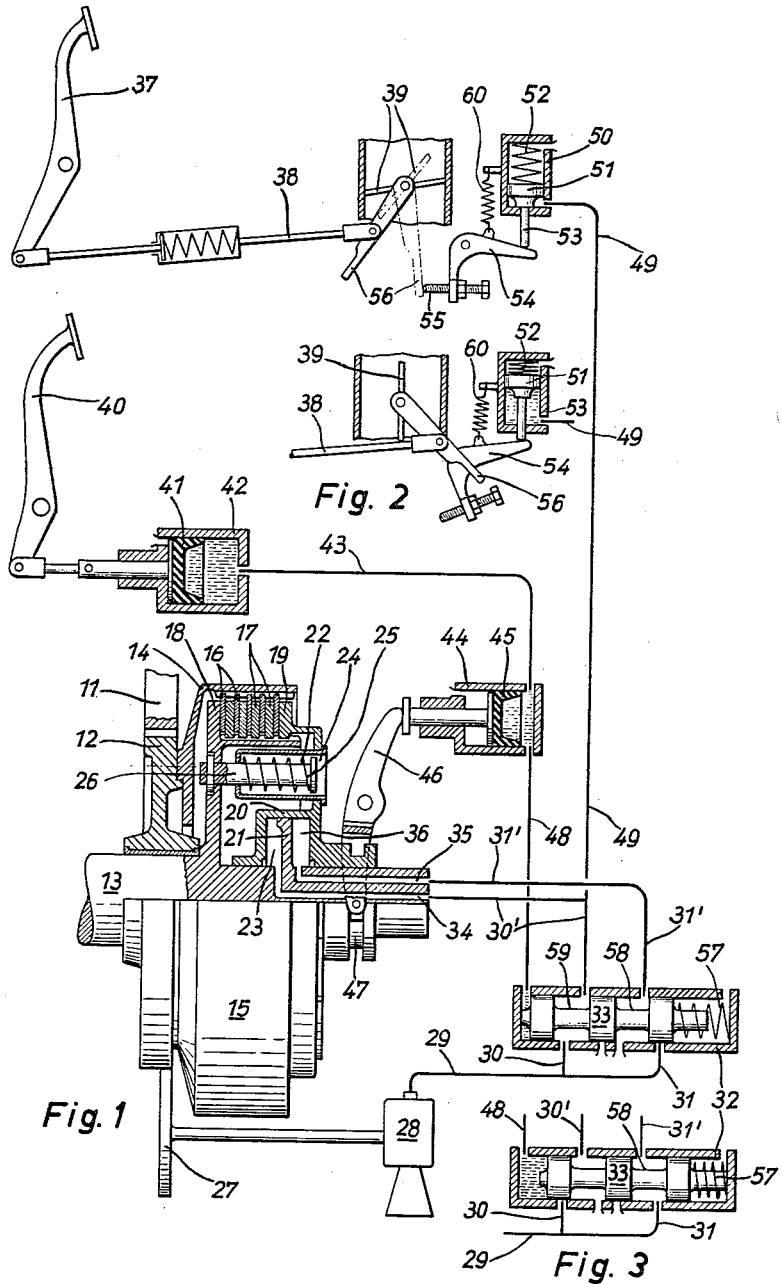

3,105,578
CLUTCH-ACTUATING SYSTEM
Gustav Meyer, Friedrichshafen, Germany, assignor to Maybach-Motorenbau G.m.b.H., Friedrichshafen, Germany, a firm
Filed Oct. 11, 1960, Ser. No. 62,020
5 Claims. (Cl. 192—.084)

This invention relates to an actuating system for a friction clutch, in particular for tracked vehicles, which is arranged between an internal combustion engine and a change speed gear and which is held in engagement by means of a spring and by the force produced by auxiliary power supply means and which can be disengaged against the force of the spring. In the case of a tracked vehicle the internal combustion engine may be of high power, for example 1000 H.P. or more.

In the system according to the invention the clutch can be disengaged also if no auxiliary power is available. In a conventional arrangement of an auxiliary power-actuated clutch of a motor vehicle of the clutch is engaged by means of a spring and is disengaged by a hydraulic apparatus actuated by the clutch pedal. If the clutch must transmit very high torques, the spring forces maintaining the clutch in the engaged position are so great that the operator is unable to disengage the clutch via a hydraulic transmission.

The apparatus according to the invention overcomes this disadvantage by reducing the force of the spring maintaining the clutch in the engaged position to a fraction of the value necessary for transmitting the full torque, the balance of the clutch-engaging force necessary for transmission of the full torque being supplied by auxiliary power. Contrary to the known clutches, therefore, the clutch according to the invention requires auxiliary power not only for disengaging the clutch but also for engaging it and maintaining it in the engaged position.

Since relatively little spring pressure is relied upon for engaging the clutch, the clutch can be easily disengaged if there is no auxiliary power available, in contradistinction to conventional systems in which the spring supplies the entire engagement pressure which is difficult to overcome, for disengagement of the clutch, if no auxiliary power is available.

In order to prevent the engine to deliver a greater torque than that corresponding to the pressure produced by the spring for engaging the clutch, provisions must be made for operating the engine at partial throttle, upon failure of the auxiliary power. If the clutch pedal actuates a hydraulic transmission pressurizing the end face of a piston valve controlling the auxiliary power supplied to the motor operator of the clutch, an abutment is preferably provided which, upon failure of the auxiliary power, limits the stroke of the accelerator linkage in order to limit the torque developed by the engine. If auxiliary power is available, the arrangement according to the invention permits full stroke of the accelerator linkage.

The novel features which are considered characteristic of the invention are set forth with particularity in the appended claims. The invention itself, however, and additional objects and advantages thereof will best be understood from the following description of an embodiment thereof when read in connection with the accompanying drawing, wherein:

FIG. 1 is a diagrammatic part sectional illustration of a clutch and actuating means therefor according to the invention.

FIGS. 2 and 3 show parts of the actuating means shown in FIG. 1 in different operating positions.

Referring more particularly to the drawing, numeral 11 designates a first gear where driven by an internal combustion piston engine, not shown, and in mesh with a second gear wheel 12 which is rotatable on a drive shaft 13 for a change speed gear, not shown. To the gear wheel 12 is firmly connected the outer housing 14 of a friction clutch 15 having annular friction elements 16 axially movably connected to the housing 14 and adapted to axially engage annular friction elements 17 axially movably mounted on a member 18 which is rigidly connected to the drive shaft 13. A pressure element 19 acting upon the elements 16 and 17 is firmly connected to a control cylinder 20 which is coaxial of and axially displaceable on the shaft 13. A piston 21 secured to the drive shaft 13 is arranged in the cylinder 20. If a pressure fluid is introduced into a space 23 in the cylinder 20 at the left side of the piston 21, the cylinder 20 is moved to the left and the pressure element 19 connected to the cylinder 20 compresses the elements 16 and 17 whereby the clutch is engaged. Springs 22 are arranged in containers 24 which are secured to the pressure element 19 of the clutch 15. The right ends of the springs 22 abut against flanges 25 at the ends of pins 26 secured in the clutch member 18. The left ends of the springs 22 press against the bottom of the containers 24, thereby urging the pressure element or plate 19 to the left into clutch engaging position. Whereas the springs 22 permanently tend to engage the clutch, the hydraulic device 20–23 assists in engaging the clutch only upon admission of a pressure fluid into the chamber 23.

A drive wheel 27 for a pump 28 is driven by the gear wheel 12 for compressing a fluid used for providing auxiliary power for actuating the clutch. The pump 28 is connected by a pipe 29, which branches into two pipes 30 and 31, to a housing 32 of a piston valve 33. Depending on the position of the valve 33, the pipe 30 is connected for fluid flow to a pipe 30′, the latter being connected to a channel 34 in the drive shaft 13, which channel terminates in the space 23 of the cylinder 20. The pipe 31 may be connected by the valve 33 to a pipe 31′ which discharges into a channel 35 in the shaft 13, which channel terminates in a space 36 in the cylinder 20 at the right side of the piston 21. If the valve 33 is in the position shown in FIG. 1, pressure fluid is admitted to the chamber 23 and relieved from the chamber 36 so that the cylinder 20 is urged to the left causing engagement of the clutch. If the valve 33 is in the position shown in FIG. 3, pressure fluid is admitted to chamber 36 and relieved from chamber 23 so that the cylinder 20 and the pressure element 19 move to the right, disengaging the clutch against the action of springs 22.

Numeral 37 designates an accelerator pedal which actuates a throttle valve 39 by means of a conventional linkage 38.

A clutch pedal 40 is connected in the conventional manner to a piston 41 in a cylinder 42. Liquid can be pressed by the piston 41 through a pipe 43 into a cylinder 44 to act upon a piston 45 which is operatively connected to a control lever 46. One arm of the latter acts on a clutch-actuating sleeve 47 which is firmly connected to the cylinder 20. Depression of the pedal 40 causes counterclockwise rocking of the lever 46 and movement of the elements 20, 19 to the right for disengagement of the clutch 15. A pipe 48 connects the cylinder 44 to the left end of the valve housing 32 for admitting pressure fluid from the cylinder 44 to the housing 32 and pressing valve 33 to the right into the position shown in FIG. 3. In this position of the valve 33 pressure fluid is relieved from the space 23 and admitted to the space 36 so that the clutch is disengaged as described above against the action of the springs 22. The pressure on the clutch pedal required for disengaging the clutch is very little and needs to overcome only the pressure of a weak spring 57 which tends to hold the valve 33 in the position shown in FIG. 1. A pipe 49 connects the pipe 30' to a cylinder 50 containing a piston 51.

If for any reason, for example, the pump 28 is damaged and does not deliver pressure fluid, there is no pressure in the pipes 29, 30 and 31. Although the valve piston 33 is held by the spring 57 in the position shown in FIG. 1 there is no pressure in the space 23 and engagement of the clutch 15 is maintained only by the pressure exerted by the springs 22. There is also no pressure in the pipe 49 so that the piston 51 in the cylinder 50 is moved by a spring 52 to its lower limit position, as shown in FIG. 1. During this movement of the piston 51 an elbow lever 54, one arm of which is provided with an adjusting screw 55, is moved clockwise by means of a pin 53 extending from the piston 51 so that the screw 55 forms an abutment for an arm 56 connected to the throttle valve 39, preventing full opening of the throttle valve 39. The limit of maximum opening of the accelerator throttle valve 39 under these conditions can be adjusted by suitable setting of the screw 55 so that the engine is unable to deliver a greater torque than that corresponding to the pressure of the springs 22 which maintains engagement of the clutch 15.

Since engagement of the clutch is now effected only by the pressure of the springs 22, the operator is in a position to disengage the clutch entirely without auxiliary power by depressing the clutch pedal 40. In doing so, the valve 33 is moved against the pressure of the spring 57 into the extreme right position shown in FIG. 3, whereby pressure fluid can flow unhindered from the pipe 31 through an annular groove 58 of the piston valve 33 into the pipe 31' and into the channel 35. This, however, has no effect, because the pump 28 does not deliver pressure fluid.

If pressure fluid is delivered by the pump 28 into the pipes 29, 30 and 31 and the system is in the position shown in FIG. 1, pressure fluid flows through an annular groove 59 of the piston valve 33 into the pipe 49 and into the space in the cylinder 50 below the piston 51, moving the latter into the upper limit position shown in FIG. 2. The elbow lever 54 and the abutment screw 55 are thereby moved counterclockwise by a spring 60 and out of the way of the lever 56 so that the throttle valve 39 can be moved into open position as shown in FIG. 2.

What is claimed is:

1. A friction clutch system for transmitting torque from an internal combustion engine to a change speed gear, comprising:

a clutch having a driving part and a driven part,
friction elements axially movably connected to said driving part and to said driven part,
a hollow fluid pressure cylinder axially movably connected to said driven part,
a pressure plate rigidly connected to said cylinder and engageable with said friction elements for pressing the latter against one another for engaging the clutch upon axial movement of said cylinder and pressure plate in one direction and for releasing said friction elements from each other for disengaging the clutch upon axial movement of said cylinder and pressure plate in the opposite direction,
spring means interposed between said pressure plate and said driven part for urging said pressure plate and cylinder in the direction for pressing said friction elements against one another and engaging the clutch,
a piston element rigidly connected to said driven part and placed in said cylinder for dividing the latter into two chambers,
a pump for supplying a pressure fluid,
a conduit means interconnecting said pump and said two chambers,
a control valve interposed in said conduit means so constructed and arranged as to selectively permit flow of pressure fluid from said pump into one of said chambers and to relieve pressure fluid from the second chamber for moving said cylinder and pressure plate against the action of said spring means to disengage the clutch and to permit flow of pressure fluid from said pump into the second chamber and to relieve pressure fluid from said first chamber for assisting said spring means to move said cylinder and said pressure plate into clutch engaging position, and
a pedal, a hydraulic actuating means operatively connecting said pedal to said control valve for placing said control valve into the position for supplying pressure fluid to said first chamber for disengaging said clutch upon movement of said pedal in one direction and for supplying pressure fluid to the second chamber for engaging said clutch supplementally to said spring means upon movement of said pedal in the opposite direction.

2. A friction clutch system as defined in claim 1 wherein said pump is operatively connected to said driving part to be driven thereby.

3. A friction clutch system as defined in claim 1 including resilient means operatively associated with said control valve for urging the latter and said pedal into the position for engaging the clutch.

4. A friction clutch system as defined in claim 1 wherein said pedal is also operatively connected to said cylinder for placing, upon failure of pressure fluid supply from said pump, said cylinder and said pressure plate into the position for disengaging the clutch against the action of said spring means upon movement of said pedal in one direction and for allowing said spring means to move said cylinder and said pressure plate into the position for engaging said clutch and to move said pedal in the opposite direction, upon failure of pressure fluid supply from said pump.

5. A friction clutch system for transmitting torque from an internal combustion engine to a change speed gear, comprising:

a clutch having a driving part and a driven part,
friction elements axially movably connected to said driving part and to said driven part,
a hollow fluid pressure cylinder axially movably connected to said driven part,
a pressure plate rigidly connected to said cylinder and engageable with said friction elements for pressing said friction elements against one another for engaging the clutch upon axial movement of said cylinder and said pressure plate in one direction and for releasing said friction elements from each other for disengaging the clutch upon axial movement of said cylinder and pressure plate in the opposite direction,
spring means interposed between said pressure plate and said driven part for urging said pressure plate and cylinder in the direction for pressing said friction elements against one another and engaging the clutch,
a piston element rigidly connected to said driven part and placed in said cylinder for dividing the latter into two chambers,
a pump for supplying a pressure fluid,
conduit means interconnecting said pump and said two chambers,
a control valve interposed in said conduit means for either allowing flow of pressure fluid from said pump into one of said chambers and relief of pressure fluid from the second chamber for moving said cylinder and said pressure plate against the action of said spring means for disengaging said clutch or allowing flow of pressure fluid from said pump into the second chamber and relief of pressure fluid from the first chamber for urging said cylinder and said pressure plate into clutch engaging position and supplementing the clutch engaging force exerted by said spring means,
a pedal, a hydraulic actuating means operatively connecting said pedal to said control valve for placing said control valve into the position for supplying pressure fluid to said first chamber for disengaging said clutch upon movement of said pedal in one direction and for supplying pressure fluid to the second chamber for engaging said clutch supplementally to said spring means upon movement of said pedal in the opposite direction, said pedal being also operatively connected to said cylinder for placing, upon failure of pressure fluid supply from said pump, said cylinder and said pressure plate into clutch disengaging position against the action of said spring means upon movement of said pedal in one direction and for allowing said spring means to move said cylinder and said pressure plate into the position for engaging said clutch and to move said pedal in the opposite direction, upon failure of pressure fluid supply from said pump, a throttle valve for controlling fuel supply to the internal combustion engine, a stop movable into a position for limiting opening of said throttle valve and into a position allowing full opening of said throttle valve, means including resilient means for urging said stop into the position for limiting opening of said throttle valve and including pressure fluid actuated means for urging said stop into the position allowing full opening of said throttle valve against the action of said resilient means, and conduit means interconnecting said control valve and said pressure fluid actuated means for conducting pressure fluid from said pump to said pressure fluid actuated means for actuating the latter for moving said stop into the position allowing full opening of said throttle valve when said control valve is in the position allowing flow of pressure fluid to said second chamber for engaging said clutch by said pressure fluid in addition to the action of said spring means and for allowing said resilient means to urge said stop into the position for limiting opening of said throttle valve upon failure of pressure fluid supply from said pump.

References Cited in the file of this patent

UNITED STATES PATENTS

| | | |
|---|---|---|
| 1,891,678 | Maybach | Dec. 20, 1932 |
| 2,062,484 | Timian | Dec. 1, 1936 |
| 2,229,055 | Dick | Jan. 21, 1941 |
| 2,414,717 | Chapman | Jan. 21, 1947 |
| 2,572,660 | Price | Oct. 23, 1951 |
| 2,933,168 | Leibing et al. | Apr. 19, 1960 |